3,107,511
COLORED FLAME CANDLE
Xénia Hamsag-Garshanin and Ernest Hamsag, both of 19 Crets de Champel, Geneva, Switzerland
No Drawing. Filed June 15, 1961, Ser. No. 117,279
Claims priority, application Switzerland June 17, 1960
4 Claims. (Cl. 67—22)

The present invention relates to a new and improved colored flame candle and the method of making the same.

Numerous attempts have been made to produce colored flame candles, but insofar as is known all of the products of this nature at present obtained are unsatisfactory for one or more of the following reasons: Combustion of the materials used produces nauseous or even toxic vapours or smoke; or excessive smoking results in obscuring the color of the flame; or smoking results in depositing unconsumed residues on the wick, thus extinguishing the candle prematurely; or the materials used result in guttering or sputtering while burning.

It is an object of this invention to avoid these inconveniences and to produce a candle of high quality capable of burning uniformly without sputtering and almost without guttering, without toxic effects of any kind.

A further object of the invention is to produce a candle body which has almost the same composition for all of the various color producing elements incorporated therein or in the wick.

A still further object of the invention is to produce a candle capable of emanating an intensively colored flame which is not obscured by excessive smoke.

According to an important characteristic of the invention, the combustible body of the colored flame candle is composed at least partly of at least one polymerized alcohol, and the candle includes, in the wick and/or in the body, a heat decomposable flame coloring ingredient.

In a preferred form of realization embodying the invention, the candle body is composed at least partly of polyethylene glycol and further includes an organic compound with oxygen function having 2 to 5 carbon atoms and 1 to 7 oxygen atoms, the melting point of which is comprised between 40° and 160° C. such as, for instance, ethyl oxamate ($NH_2COCOOC_2H_5$).

In order to increase the fluidity in the molten state, it is desirable to incorporate to the material which constitutes the body a modifier such as ethylene glycol or another non polymerized or low polymerized alcohol such as propylene glycol or glycerol.

The grade of polymerization or the polymerized alcohol used for the candle body and thus its solidification point can vary according to the use. As an example, polyethylene glycols having a molecular weight of about 1300 to about 4500 and a solidification point between about 40° C. and about 55° C. are very satisfactory. It may be desirable to use as a basic material polyethylene glycols with molecular weight between 1300 and 1600 having a solidification point of 40° C. to 45° C. and to make said basic material less hygroscopic by means of an outer coating of polyethylene glycol having a molecular weight of 3000 to 4500 and a solidification point of 45° to about 55° C., or more generally of a polymerized alcohol having a heavier molecular weight than that used as the main component of the combustible body.

In order to facilitate the combustion, it may be desirable to mix to the basic polymer certain organic substance having a higher content of oxygen such as esters or ethers. Among the additional non polymerized substances, alcohols such as ethyl, methyl, propyl or butyl alcohol or dioxane can be preferably used.

As a heat decomposable flame-coloring material, organic acid salts of metals such as sodium, potassium, lithium, strontium, barium, copper, etc., can be advantageously used, as well as boric acid, according to the color to be obtained; two or more of these salts can be mixed to obtain various colour shades or brilliancies. Among the organic acid salts which are satisfactory, the following can be preferably used: citrates, acetates, oxalates, formates, tartrates, malates, malonates and maleates. The flame-coloring substances can be dissolved or dispersed in the combustible body or/and impregnated in the wick.

In order to produce a colored flame comparable with that of a conventional candle, it is desirable to use wicks of larger section and less close in texture than those used in the conventional wax candles, as the molten material of the body is generally more viscous than the molten wax.

If desired, any aromatic substance such as incense or other resin or essence able to emit odorous vapours by burning can be admixed to the combustible mass.

In practicing the invention, the following examples are given as illustrative and are not to be taken as limiting:

*Example 1 for a Green Colored Flame*

| | Gr. |
|---|---|
| Polyethylene glycol mol. weight 1300 to 1600 (solidification point: about 43° C.) | 100 |
| Ethylene glycol ($HO-CH_2-CH_2-OH$) | 22 |
| Boric acid ($H_3BO_3$) | 3 |
| Silver pine oil | 1 |

The mixture (without the oil) is heated at about 170° C. to eliminate the water resulting from the formation of boric esters. After cooling of the molten mass to 70°–100° C., the pine oil and if desired any suitable organic dye can be added and the mass is then cast or molded round a suitable wick.

This candle can be made less hygroscopic or even completely insensitive to moisture by dipping it in a molten mixture of

| | Gr. |
|---|---|
| Polyethylene glycol mol. weight 3000–3500+4000–4500 (solidificaion point 53° C.) | 100 |
| Ethylene glycol | 6 |

To this mixture also odoriferous substance or organic dye can be admixed.

*Example 2 for a Red Colored Flame*

| | Gr. |
|---|---|
| Polyethylene glycol mol. weight 3000–3700 (solidification point 48° C.) | 100 |
| Ethylene glycol | 22 |
| Citric acid | 2 |
| Lithium citrate (tribasic) | 2 |

Citric acid and lithium citrate are dissolved in about 40 cc. hot distilled water and the solution is added to the molten mixture of polyethylene glycol and ethylene glycol; the mass is heated to a temperature not exceeding 140° C. After cooling to below 100° C. the candle is then cast round a suitable wick. The candle thus obtained can also be coated with a mixture similar to that of Example 1, the melting point of which is about 46° C.

*Example 3 for a Golden Colored Flame*

The citrate of lithium in Example 2 is replaced by 2 gr. of sodium citrate.

*Example 4 for a Red Colored Flame*

| | | |
|---|---|---|
| Polyethylene glycol mol. weight 4000 | gr | 30 |
| Ethyl oxamate | gr | 12–18 |
| Glycerol | cc | 4–8 |

The wick is previously impregnated with an aqueous solution of lithium oxalate and dried. The lithium oxalate solution can also contain free oxalic acid.

We claim:

1. A colored flame candle comprising a heat-decomposable flame-coloring ingredient, a wick, and a combustible body consisting essentially of 100 parts by weight of a polyethylene glycol having a molecular weight of 3000–4500, and 6–33 parts by weight of a polyhydric alcohol selected from the group consisting of ethylene glycol, propylene glycol, and glycerol, said heat decomposable flame-coloring ingredient being selected from the group consisting of organic acid salts of metals wherein said metal portion is selected from the group consisting of sodium, potassium, lithium, strontium, barium, and copper, and wherein said acid portion is selected from the group consisting of citric acid, acetic acid, oxalic acid, formic acid, tartaric acid, malic acid, malonic acid and maleic acid; and boric acid.

2. The colored flame candle of claim 1, said combustible body further comprising 40–60 parts by weight of ethyl oxamate.

3. A colored flame candle comprising a heat decomposable flame-coloring ingredient, a wick, and a body of combustile material having an outer coating composed of 100 parts by weight of a polyethylene glycol having a molecular weight of 3000–4500, and about 6 parts by weight of a polyhydric alcohol selected from the group consisting of ethylene glycol, propylene glycol and glycerine, whereby said coating functions to make the candle less hygroscopic, the body of said combustible material having a like composition of lower molecular weight than the outer coating, and said decomposable flame-coloring ingredient being selected from the group consisting of organic acid salts of metals wherein said metal portion is selected from the group consisting of sodium, potassium, lithium, strontium, barium, and copper, and wherein said acid portion is selected from the group consisting of citric acid, acetic acid, oxalic acid, formic acid, tartaric acid, malic acid, malonic acid and maleic acid; and boric acid.

4. A colored flame candle comprising a heat decomposable flame-coloring ingredient, a wick, and a body of combustible material composed of 100 parts by weight of a polyethylene glycol having a molecular weight of 1300–1600 and 6–33 parts by weight of a polyhydric alcohol selected from the group consisting of ethylene glycol, propylene glycol and glycerol, said combustible body having an outer coating composed of 100 parts by weight of a polyethylene glycol having a molecular weight of 3000–4500 and about 6 parts by weight of a polyhydric alcohol selected from the group consisting of ethylene glycol, propylene glycol, and glycerol, whereby said coating functions to make the candle less hygroscopic.

References Cited in the file of this patent

UNITED STATES PATENTS

| | | |
|---|---|---|
| 984,029 | Scheuble | Feb. 14, 1911 |
| 1,701,844 | Funke | Feb. 12, 1929 |
| 2,184,666 | Fredericks | Dec. 26, 1939 |
| 2,504,211 | Means | Apr. 18, 1950 |
| 2,551,574 | Fredericks | May 8, 1951 |